Oct. 21, 1930.  G. C. BATZ  1,779,157
SOUND INSULATED COACH TRUCK
Filed May 4, 1929  2 Sheets—Sheet 1
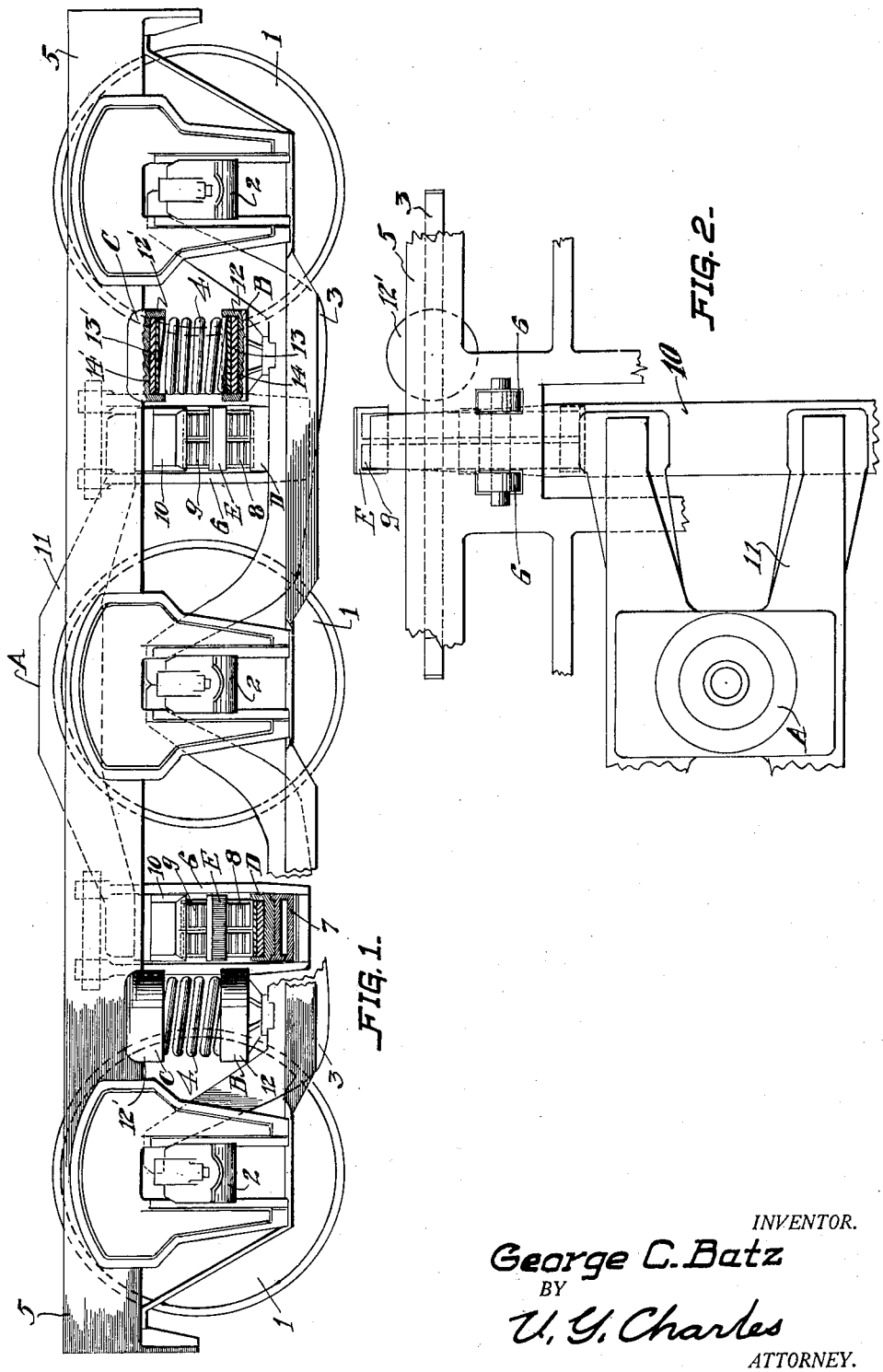
INVENTOR.
George C. Batz
BY
U. G. Charles
ATTORNEY.

Oct. 21, 1930.  G. C. BATZ  1,779,157
SOUND INSULATED COACH TRUCK
Filed May 4, 1929  2 Sheets-Sheet 2
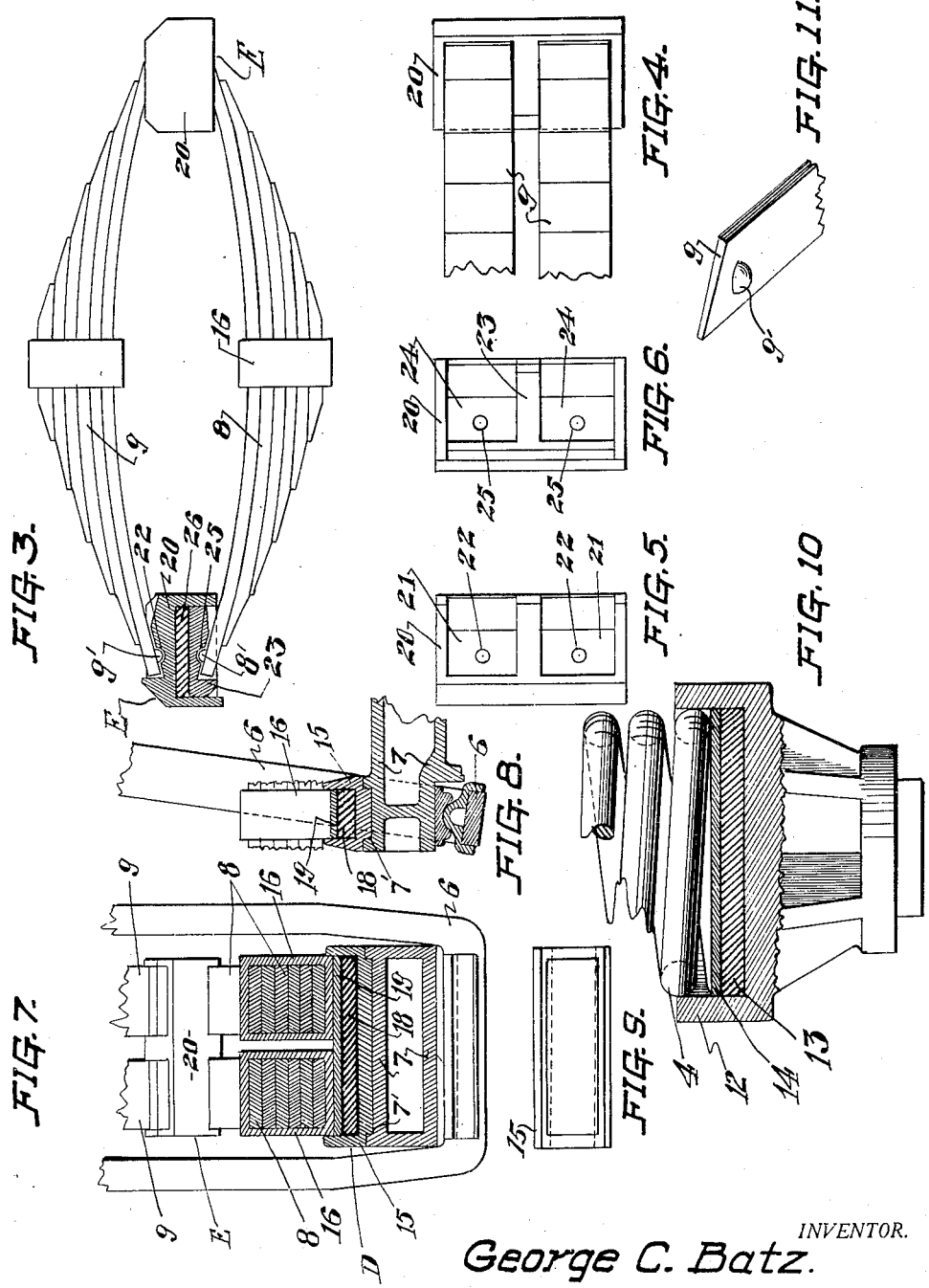
INVENTOR.
George C. Batz.
BY
U. G. Charles.
ATTORNEY.

Patented Oct. 21, 1930

1,779,157

UNITED STATES PATENT OFFICE

GEORGE C. BATZ, OF TOPEKA, KANSAS

SOUND-INSULATED COACH TRUCK

Application filed May 4, 1929. Serial No. 360,429.

My invention relates to improvements in sound insulated coach trucks.

The object of my invention is to provide means to deaden the transmission of noise, created by the contact of the wheels of a railroad coach truck with the rails, to the body of the coach.

A still further object of my invention is to deaden the transmission of sound from the wheels of the truck to the coach body by the insertion of rubber members or similar media whose characteristics would be to absorb the vibrations of sound rather than transmit them between the bearing points of the component parts of the truck.

A still further object of my invention is to deaden the transmission of sound vibrations from the wheels of the coach truck to the body of the coach by the insertion of rubber members between the bearing points at the equalizer springs and at the elliptical springs of the truck.

A still further object of my invention is to provide a means of sound insulation between the ends of the elliptical springs and their bearing points comprising a box-like structure of two parts slidably positioned to each other, and each of the parts having seats therein for the ends of the springs and the parts being separated from vertical contact by a cushion composed of rubber, cork, or any good sound deadening media.

A still further object of my invention is to provide a rectangular box-like structure designed to be interposed between the strap on the lower elliptical spring and what is commonly known as the sand plank on the truck and being hollow to accommodate a rectangular rubber shim on which the strap will rest. The rubber shim acting to retard the vibrations of sound between the sand plank and the elliptical spring.

A still further object of my invention is to further insulate the component members of a coach truck against the transmission of sound by the insertion of circular rubber shims in the upper and lower bearing points of the helical equalizer springs to absorb the vibrations of sound that may be transmitted from the equalizers to the main frame of the truck.

These and other objects will hereinafter be more fully explained.

Referring to the drawings:

Fig. 1 is an elevation of a coach truck illustrating the location of the sound deadening members with regard to the essential parts of the truck.

Fig. 2 is a fragmentary plan view of Fig. 1.

Fig. 3 is an elevation of one of the elliptical springs showing one of the cushioned spring clips in cross section.

Fig. 4 is a fragmentary plan view of the elliptical springs illustrating the position of the spring leaves on the clip.

Fig. 5 is a plan view of the upper portion of the cushioned spring clip.

Fig. 6 is a plan view of the lower portion of the spring clip.

Fig. 7 is a cross sectional fragmentary view of the elliptical spring and cushioning means inserted between the lower portion of the spring and the sand plank.

Fig. 8 is a fragmentary elevation of Fig. 7 with parts in section.

Fig. 9 is a bottom view of the cushion box shown in Figs. 7 and 8.

Fig. 10 illustrates the method in which the rubber cushion is inserted in one of the lower bearing points of one of the equalizer springs.

Fig. 11 is a perspective view of the end of one of the lower leaves of the elliptical springs illustrating the hemi-spherical protrusions.

A railroad coach truck having wheels 1 supports the load of a coach through the journals 2 to the equalizer bars 3, thence through the equalizer springs 4 to the frame 5 from which are suspended the hangers 6 carrying the sand planks 7 upon which rest the elliptical springs 8 and 9, which in turn carry the bolster 10 bearing the center bolster 11 upon which the coach rests at A. The contact of the wheels 1 with irregularities in the rails, crossings, switch frogs, joints and the like, creates a sound vibration which is ordinarily transmitted through the component parts of the truck heretofore described and to the body of the coach where it is ofttimes magnified to the annoyance of the passengers. The elimination of this is especially important with regard to sleeping cars, whether for passenger traffic or for the accommodation of freight train personnel.

In order to absorb these vibrations I have provided means for that purpose at the following points: At B, the lower bearing of the equalizer, at C, the upper bearing of the equalizer, at D, between the strap or bearing point on the lower portion of the elliptical spring and the sand plank, and at E, the spring clip of the elliptical spring.

At B, I have installed in the bearing cup 12 a sound insulating member 13 comprised of rubber, cork, felt or similar material having sound deadening qualities, which acts as an insulating media against transmission of sound vibration. The member 13 is circular in shape to fit the formation of the cup. A metal disc 14 is interposed between the insulating means 13 and the coils of the spring 4 to assure distribution of load upon the insulating member and to prevent its mutilation by the spring. The arrangement at C is similar to that at B and the members 12', 13', and 14' correspond to the members 12, 13, and 14 respectively in their function except that the order of position is reversed.

At D, I have interposed a rectangular box 15 formed as illustrated in Figs. 7, 8, and 9, the lower portion of which is extended to correspond in area and thickness to the strap 16 of the spring 8 and fits into a recess provided therefor in the sand plank 7 at 7'. The box 15 contains the rectangular cushion 18 comprised of material similar to that of 13. A metal shim 19 is inserted between the straps 16 and the member 18 as a protective means against abrasion of the insulating material.

At E, I have inserted a spring clip, comprising a box-like structure 20 whose upper portion has the spring seats 21 in which are impressed the hemi-spherical depressions 22. A similar plurality of seats is formed into the lower portion or plate 23 having spring seats 24 and depressions 25. The plate is rectangular in shape and slidably engages the walls of the box 20 as shown. Interposed between the plate 23 and the corresponding portion of the box 20 is the cushion 26 composed of material similar to the cushions 18, 13, and 13'. The lower leaf of the spring 9 has at each end the hemi-spherical protrusion 9' formed to rest in the depressions 22 as illustrated. The upper leaf of the spring 8 is formed in a similar manner having the hemi-spherical protrusions 8' arranged to fit the depressions 25. This spring clip is described and claimed in my application Serial No. 435,486, filed March 13, 1930, entitled "Improvements in sound insulated spring clips".

By reason of the sound deadening means inserted at B, C, D, and E, I have overcome the transmission of sound vibration, occurring at the rolling engagement of the wheels with the rails, from the wheels to the body of the truck.

The installation of a good sound insulating media at any one of the points herein described as B, C, D, and E would theoretically absorb the sound vibrations from further transmission. However in the application of this principle to railroad trucks of the kind described, the necessary thickness of sound deadening media to accomplish this purpose at just one of the said points would be impractical for the conversion of coach trucks now in use. It is found that in actual practice the three point installation is the most economical for the effect desired. I have found that the installation of the insulating medium between the parts of the elliptical spring, by means of the spring clip herein disclosed, has proven the most effective for its purpose when only the one point insulation is considered.

Such modifications may be employed as lie within the scope of the appended claims.

What I claim as new and desire to secure by Letters Patent is:

1. In a sound insulated railway coach truck the combination of the component parts of the coach truck herein described and a cushioned spring clip positioned between the portions of the elliptical springs, a cushioned box positioned between the elliptical springs and the sand plank and a plurality of disc-like cushions inserted at the bearing points of the equalizer springs, the said cushioned spring clips, the said cushioned box, and the said plurality of disc-like cushions formed and positioned as herein specified.

2. In a sound insulated railway coach truck the combination of the component parts of the coach truck herein described and a cushioned box positioned between the elliptical springs and the sound plank and a plurality of members composed of a sound deadening media inserted at the bearing points of the equalizer springs, the cushioned box and the said members formed and positioned as herein specified.

In testimony whereof I affix my signature.

GEORGE C. BATZ.

CERTIFICATE OF CORRECTION.

Patent No. 1,779,157.  Granted October 21, 1930, to

GEORGE C. BATZ.

It is hereby certified that error appears in the printed specification of the above numbered patent requiring correction as follows: Page 2, line 108, claim 2, for the word "sound" read sand; and that the said Letters Patent should be read with this correction therein that the same may conform to the record of the case in the Patent Office.

Signed and sealed this 3rd day of November, A. D. 1931.

(Seal)

M. J. Moore,
Acting Commissioner of Patents.